United States Patent
Cave et al.

(10) Patent No.: US 8,428,014 B2
(45) Date of Patent: Apr. 23, 2013

(54) METHOD AND APPARATUS FOR PERFORMING AN ENHANCED RANDOM ACCESS CHANNEL PROCEDURE IN A CELL_FACH STATE

(75) Inventors: Christopher R. Cave, Montreal (CA); Rocco DiGirolamo, Laval (CA); Diana Pani, Montreal (CA); Benoit Pelletier, Roxboro (CA); Paul Marinier, Brossard (CA)

(73) Assignee: Interdigital Patent Holdings, Inc., Wilmington, DE (US)

( * ) Notice: Subject to any disclaimer, the term of this patent is extended or adjusted under 35 U.S.C. 154(b) by 651 days.

(21) Appl. No.: 12/346,498

(22) Filed: Dec. 30, 2008

(65) Prior Publication Data
US 2009/0186624 A1 Jul. 23, 2009

Related U.S. Application Data

(60) Provisional application No. 61/019,081, filed on Jan. 4, 2008, provisional application No. 61/047,998, filed on Apr. 25, 2008.

(51) Int. Cl.
*H04W 4/00* (2009.01)
*H04B 7/212* (2006.01)

(52) U.S. Cl.
USPC ............................. 370/329; 370/341; 370/348

(58) Field of Classification Search ........................ None
See application file for complete search history.

(56) References Cited

U.S. PATENT DOCUMENTS

| 7,301,921 B2 * | 11/2007 | Heo ................................. 370/329 |
| 7,710,938 B2 * | 5/2010 | Choi et al. ....................... 370/342 |
| 2007/0047486 A1 * | 3/2007 | Lee et al. ........................ 370/329 |
| 2007/0206531 A1 * | 9/2007 | Pajukoski et al. .............. 370/329 |

(Continued)

FOREIGN PATENT DOCUMENTS

| JP | 2003-506980 A | 2/2003 |
| WO | WO 01/11909 A1 | 2/2001 |

OTHER PUBLICATIONS

Interdigital, "Resource Release After Collision Resolution Failure", Change Request, 25.321, CR xxxx, Current Version: 8.3.0, 3GPP TSG-WG2 Meeting #63 bis, R2-085127, (Prague, Czech Republic, Sep. 29-Oct. 3, 2008).

(Continued)

*Primary Examiner* — Faruk Hamza
*Assistant Examiner* — Diane Lo
(74) *Attorney, Agent, or Firm* — Condo Roccia LLP

(57) ABSTRACT

A method and apparatus for performing an enhanced random access procedure in a Cell_FACH state are disclosed. A wireless transmit/receive unit (WTRU) transmits a random access channel (RACH) preamble for random access. If a positive acknowledgement (ACK) is received in response to the RACH preamble, the WTRU enters a contention resolution phase and transmits a message via an enhanced dedicated channel (E-DCH). If contention resolution fails, the RACH preamble is retransmitted. A contention back-off timer may be used for retransmission. A physical random access channel (PRACH) code may be reselected. The RACH preamble may be retransmitted using a reserved PRACH resource so that E-DCH resource is allocated to the collided WTRUs. Data transmitted during the contention resolution phase may remain in a hybrid automatic repeat request (HARQ) buffer. The MAC-i/is entity may be reset. All data sent during the contention resolution phase may be stored in a temporary buffer.

20 Claims, 2 Drawing Sheets

U.S. PATENT DOCUMENTS

| | | | |
|---|---|---|---|
| 2008/0192766 A1* | 8/2008 | Ranta-Aho et al. | 370/445 |
| 2009/0177941 A1* | 7/2009 | Wager | 714/752 |
| 2009/0225709 A1* | 9/2009 | Wager et al. | 370/329 |
| 2010/0215005 A1* | 8/2010 | Pradas et al. | 370/329 |

OTHER PUBLICATIONS

LG Electronics Inc., "RACH Procedure," 3GPP TSG-RAN WG2 #59, R2-073043 (Aug. 19-24, 2007).

Nokia Siemens Networks et al., "Enhanced Uplink for CELL_FACH State in FDD", TSG-RAN #37 Meeting, RP-070677, (Riga, Latvia, Sep. 11-14, 2007).

Third Generation Partnership Project, "Technical Specification Group Radio Access Network; Radio Resource Control (RRC); Protocol Specification (Release 1999)," 3GPP TS 25.331 V8.0.0 (Sep. 2007).

Third Generation Partnership Project, "Technical Specification Group Radio Access Network; Radio Resource Control (RRC); Protocol Specification (Release 1999)," 3GPP TS 25.331 V8.4.0 (Sep. 2008).

Third Generation Partnership Project, "Technical Specification Group Radio Access Network; Medium Access Control (MAC) Protocol Specification (Release 7)," 3GPP TS 25.321 V7.5.0, (Jun. 2007).

Third Generation Partnership Project, "Technical Specification Group Radio Access Network; Medium Access Control (MAC) Protocol Specification (Release 7)," 3GPP TS 25.321 V7.6.0, (Sep. 2009).

Third Generation Partnership Project, "Technical Specification Group Radio Access Network; Medium Access Control (MAC) Protocol Specification (Release 7)," 3GPP TS 25.321 V7.10.0, (Sep. 2008).

Third Generation Partnership Project, "Technical Specification Group Radio Access Network; Medium Access Control (MAC) Protocol Specification (Release 7)," 3GPP TS 25.321 V8.3.0, (Sep. 2008).

Third Generation Partnership Project, "Technical Specification Group Radio Access Network; Enhanced Uplink; Overall Description; Stage 2 (Release 7)," 3GPP TS 25.319 V7.2.0, (Mar. 2007).

Third Generation Partnership Project, "Technical Specification Group Radio Access Network; Enhanced Uplink; Overall Description; Stage 2 (Release 7)," 3GPP TS 25.319 V7.3.0, (Sep. 2007).

Third Generation Partnership Project, "Technical Specification Group Radio Access Network; Enhanced Uplink; Overall Description; Stage 2 (Release 7)," 3GPP TS 25.319 V7.6.0, (May 2008).

Third Generation Partnership Project, "Technical Specification Group Radio Access Network; Enhanced Uplink; Overall Description; Stage 2 (Release 7)," 3GPP TS 25.319 V8.3.0, (Sep. 2009).

Third Generation Partnership Support Team, "Current Minutes of the 59bis TSG-RAN WG2 Meeting (Shanghai, China, Oct. 8-12, 2007)", TSG-RAN WG2 meeting #60, R2-7xxxx, (Nov. 5-7, 2007, Korea).

3rd Generation Partnership Project (3GPP), R2-074622, "On collision resolution with Enhanced UL CELL_FACH state", Nokia, Nokia Siemens Networks, 3GPP TSG-RAN WG2 Meeting #60, Jeju, Korea, Nov. 5-9, 2007, 3 pages.

3rd Generation Partnership Project (3GPP), R2-074624, "Contention Resolution with MAC-e", Nokia Corporation, Nokia Siemens Networks, 3GPP TSG-RAN WG2 Meeting #60, Jeju, Korea, Nov. 5-9, 2007, 3 pages.

* cited by examiner

TO FIG. 2B

METHOD AND APPARATUS FOR PERFORMING AN ENHANCED RANDOM ACCESS CHANNEL PROCEDURE IN A CELL_FACH STATE

CROSS REFERENCE TO RELATED APPLICATIONS

This application claims the benefit of U.S. provisional application Nos. 61/019,081 filed Jan. 4, 2008 and 61/047,998 filed Apr. 25, 2008, which are incorporated by reference as if fully set forth.

FIELD OF INVENTION

This application is related to wireless communications.

BACKGROUND

In accordance with the Release 7 third generation partnership project (3GPP) standards, wireless transmit/receive units (WTRUs) may be in either an idle state or a connected state. Based on the WTRU mobility and activity while in the connected state, a universal terrestrial radio access network (UTRAN) may direct the WTRU to transition between a number of sub-states: Cell_PCH, URA_PCH, Cell_FACH, and Cell_DCH states. User plane communication between the WTRU and the UTRAN is only possible while in Cell_FACH and Cell_DCH states. The Cell_DCH state is characterized by dedicated channels in both uplink and downlink. On the WTRU side, the Cell_DCH state corresponds to continuous transmission and reception and may be demanding on user power requirements. The Cell_FACH state does not use dedicated channels and thus allows better power consumption at the expense of a lower uplink and downlink throughput.

In pre-Release 8 3GPP standards, uplink communication is achieved through a random access channel (RACH) mapped to a physical random access channel (PRACH). The RACH is a contention-based channel and a power ramp-up procedure is used to acquire a channel and to adjust transmit power. An RACH is a shared channel used for an initial access to obtain dedicated resources or to transmit small amount of data. Because the RACH is shared and the access is random among WTRUs, there is a possibility of collision between two or more WTRUs trying to access the channel simultaneously.

In the Release 7 3GPP specifications, the RACH procedure has two stages: a channel acquisition stage using a slotted-ALOHA mechanism followed by an RACH message transmission stage. A WTRU that wants to access a channel, randomly selects a signature and transmits an RACH preamble to a Node B during a randomly selected access slot at a certain transmit power level. If the Node B detects the signature and if an associated resource is free, the Node B transmits a positive acknowledgement (ACK) on an acquisition indicator channel (AICH). After receiving an acquisition indicator (AI), (i.e., ACK), on the AICH, the WTRU transmit an RACH message. If the associated resource is unavailable, the Node B responds with a negative acknowledgement (NACK) on the AICH. This triggers a back-off mechanism at the WTRU. The WTRU starts a back-off timer Tbo1. After expiry of the timer a preamble ramping cycle count is incremented and the procedure starts again. This effectively restarts the RACH procedure at a later random time. If the RACH preamble from the WTRU is not detected at the Node B, no AI is transmitted on the AICH. If the WTRU fails to receive an AI after transmission of the RACH preamble, the WTRU tries again in a subsequent access slot with a randomly chosen signature and a higher transmit power, up to the maximum number of times.

Since the signature is chosen randomly from a list of available signatures and the RACH access procedure is anonymous, the Node B does not know which WTRU is accessing the channel until the Node B decodes the RACH message. Therefore, when two or more WTRUs happen to chose the same signature in the same access slot and one of them is detected by the Node B, the Node B will transmit an ACK. The WTRUs will all interpret this as a having acquired the channel and will access the channel simultaneously to transmit RACH messages. This causes a collision on the RACH messages. When a collision occurs, the RACH messages may not be decoded correctly. Collisions may be difficult to detect and incur additional delays.

The RACH procedure is divided between the medium access control (MAC) layer and the physical layer. The physical layer controls the preamble transmission, signature selection, access slot selection, and preamble transmit power. On the other hand, the MAC layer controls the interpretation of the AICH response, (i.e., ACK, NACK, or no response), as well as the start of the physical layer procedure. Transmission failure and successful completion of the MAC procedure are indicated individually for each logical channel, using primitives (CMAC-STATUS-Ind for the radio resource control (RRC) or MAC-STATUS-Ind for the radio link control (RLC)).

Recently, it has been proposed to modify the uplink transmission mechanism in Cell_FACH state by combining the RACH channel acquisition stage with an enhanced dedicated channel (E-DCH). The procedure is known as enhanced uplink for Cell_FACH and IDLE mode. The Node B would choose an E-DCH resource from a set of common E-DCH resources that are shared amongst all WTRUs. The Node B responds to a WTRU channel access request by assigning one of these resources. The WTRU then starts transmission over the assigned E-DCH transport channel.

This approach would allow larger data messages to be transmitted with lower latency than what is possible with the conventional RACH. In effect, the E-DCH will likely be used for a longer period of time for data transmission. This will increase the impact that the message collisions would have on the latencies perceived by a user and on the system's spectral efficiency.

As the channel acquisition phase is identical to that of the RACH mechanism, collisions are still possible. If a collision occurs, the transmission of an uplink MAC protocol data unit (PDU) would be unsuccessful. In the case of the transmission of an RRC message, if the first PDU fails during the collision resolution phase, the entire RRC message will fail transmission. In such a case, the WTRU would have to wait a long time for the message to be retransmitted (expiry of the RRC timers). Additionally, if an unacknowledged mode (UM) radio link control (RLC) PDU that carries one segment of an RLC service data unit (SDU) fails due to collision, the remaining segments of the RLC SDU are invalid due to the fact that the receiver can no longer reassemble the RLC SDU. These scenarios will result in long transmission delays in both the RRC and application level.

Therefore, methods to minimize the upper layer delays associated with collisions and methods to control WTRU behavior after a collision should be provided.

SUMMARY

A method and apparatus for handling collisions in an enhanced random access procedure in a Cell_FACH state are disclosed. A WTRU transmits an RACH preamble for random access and waits for an AI and an E-DCH resource index. If the UE is assigned an E-DCH resource, the WTRU enters a contention resolution phase and transmits a message via an E-DCH. If contention resolution fails, a contention back-off timer may be set and the RACH preamble procedure is restarted after expiration of the contention back-off timer. Alternatively, the RACH preamble may be retransmitted with or without persistence test. A PRACH code may be reselected. The RACH preamble may be retransmitted using a reserved PRACH resource so that Node B can resolve the collision and assign E-DCH resources to the collided WTRUs.

After detecting a collision, the WTRU may stop E-DCH transmission and reception, flush the hybrid automatic repeat request (HARQ) buffers, and reset the MAC-i/is entity.

Data transmitted during the contention resolution phase may be recovered after a collision. The original data can be reconstructed from the contents of the hybrid automatic repeat request (HARQ) buffer. Alternatively, the data may be stored in temporary buffers at the RLC or MAC. The HARQ process may send a contention resolution failure indication to an RLC entity if the contention resolution fails and the RLC entity may recover the data. The contention resolution failure indication may or may not include the corresponding PDU information. If the corresponding PDU information is not included, the RLC entity may retransmit all outstanding data that needs to be acknowledged. The contention resolution failure indication may also be sent to the RRC to indicate failed RRC transmission, allowing WTRU to reset the timers and initiate retransmission before expiry of the timers.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment. When referred to hereafter, the terminology "enhanced RACH" refers to the use of an E-DCH in CELL_FACH state and in an idle mode. The enhanced RACH transmission may use Release 6 MAC-e/es entities or MAC-i/is entities that are introduced in Release 8 as part of the "Improved Layer 2" feature. The terminologies "MAC-e/es PDU" and "MAC-i/is PDU" include, but are not limited to, the PDUs generated by the MAC-e/es entities, PDUs generated by the MAC-i/is entities, or any PDUs generated by the MAC entity used to perform E-DCH transmission in the CELL_FACH state and an idle mode. When referred to hereafter, the reception of an E-DCH resource index refers to an allocation of an E-DCH resource to the WTRU via an ACK on an AICH or via a NACK on the AICH followed by an index over an extended acquisition indication set. When referred to hereafter, the terminology "physical layer PRACH transmission" or "RACH preamble transmission" refers to the physical layer process whereby the WTRU sends RACH preambles and waits for the E-DCH resource index.

Figure 1:
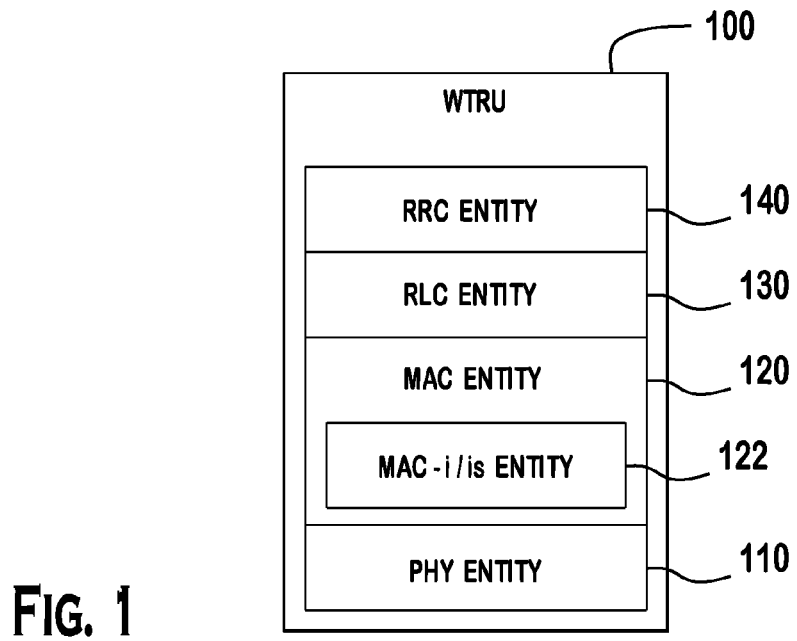
FIG. 1 is a block diagram of an example WTRU.

FIG. 1 is a block diagram of an example WTRU 100. The WTRU 100 includes a physical layer entity 110, a medium access control (MAC) entity 120, a radio link control (RLC) entity 130, a radio resource control (RRC) entity 140, and other higher layer entities. The physical layer entity 110 is configured to perform an RACH preamble transmission for random access and transmit data implementing hybrid automatic repeat request (HARQ) mechanism. The MAC entity 120 is configured to perform enhanced RACH (E-RACH) procedures that will be described in detail below, including implementation of the contention resolution phase and indication of success or failure of the contention resolution to a higher layer entity, such as the RLC entity 130 and the RRC entity 140. The MAC entity 120 includes an MAC-i/is entity 122 for E-DCH transmissions and receptions.

Figure 2A:
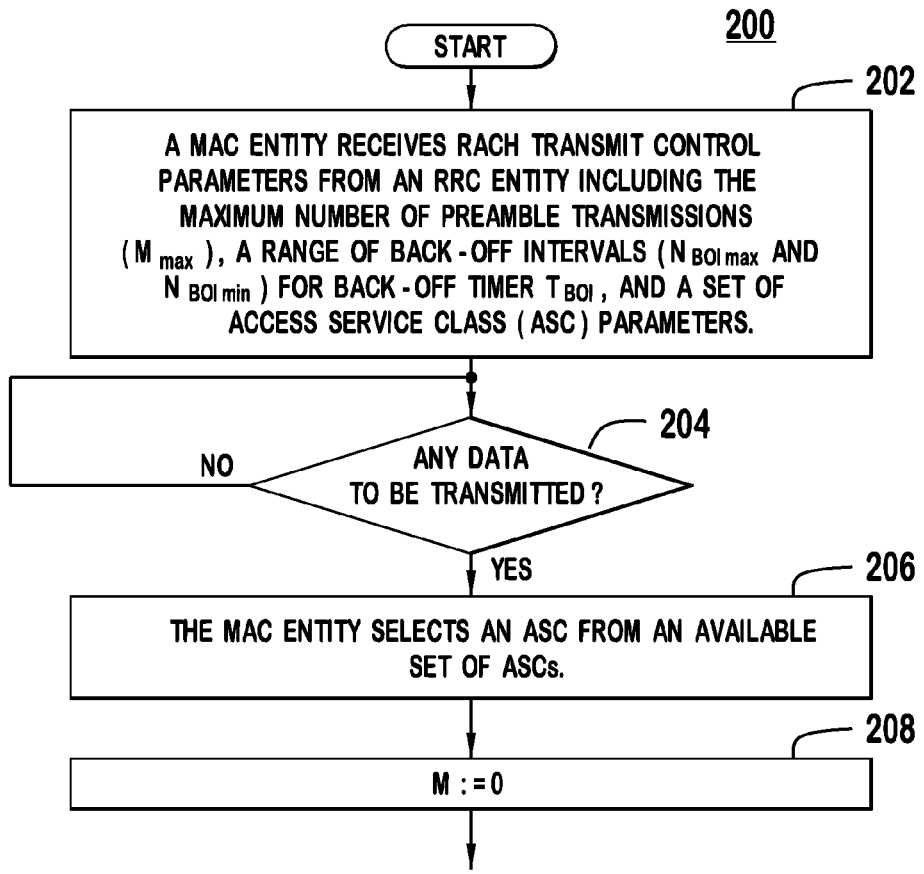
FIG. 2 is a flow diagram of an example process for random access in accordance with a first embodiment.
Figure 2B:
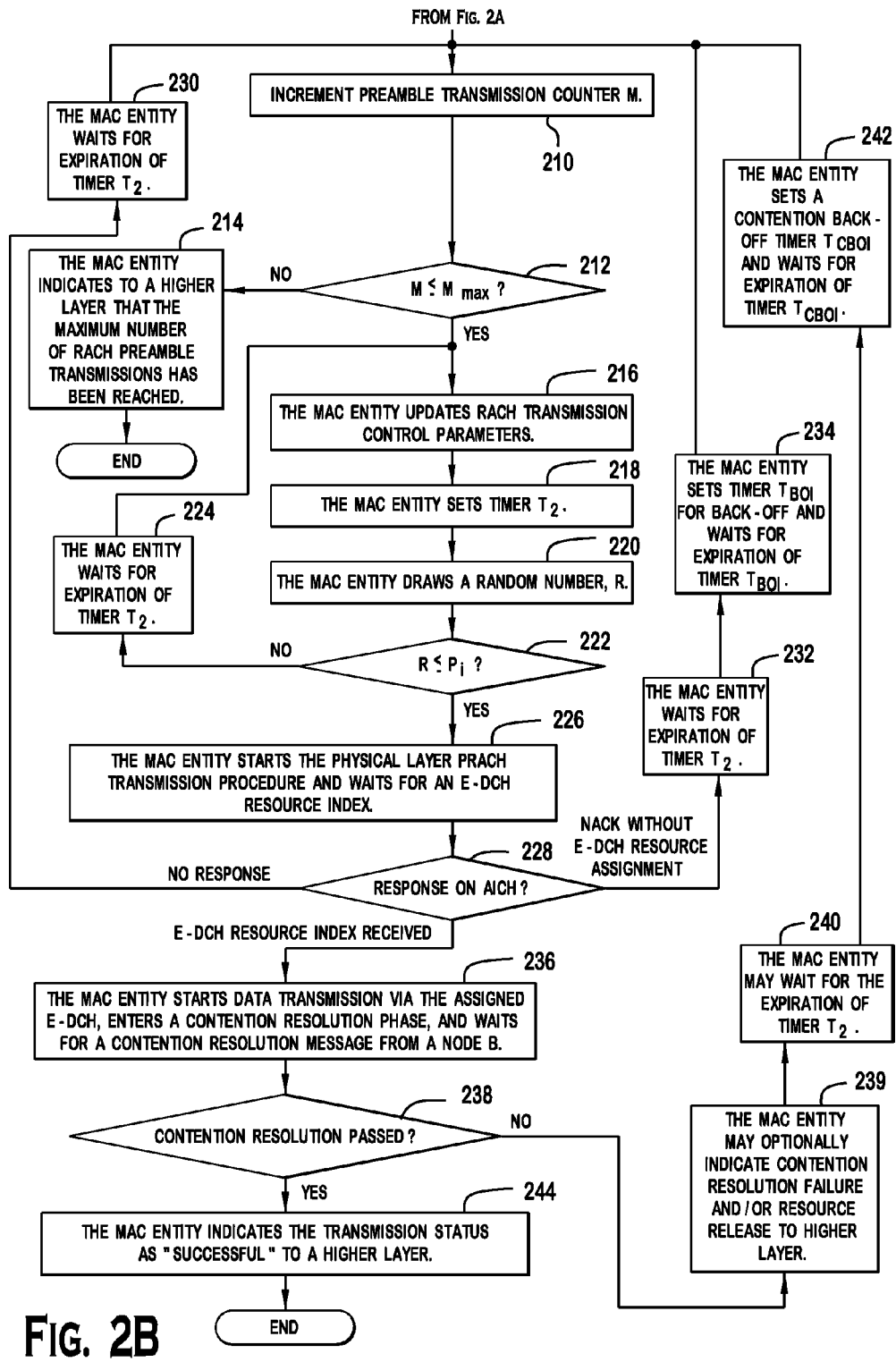

FIG. 2 is a flow diagram of an example process 200 for random access in accordance with a first embodiment. A MAC entity 120 receives RACH transmit control parameters from an RRC entity 140 including the maximum number of preamble transmissions ($M_{max}$), a range of back-off intervals ($N_{BOImax}$ and $N_{BOImin}$) for back-off timer $T_{BOI}$, and a set of access service class (ASC) parameters (step 202), etc. If it is determined that there is uplink data to be transmitted (step 204), the MAC entity 120 selects an ASC from an available set of ASCs (step 206). The ASC defines a certain partition of the PRACH resources and an associated persistence value Pi. Based on the persistence value Pi, it is determined whether the PRACH transmission procedure may begin.

An RACH preamble transmission counter (M) is reset and incremented (steps 208, 210). The RACH preamble transmission counter is compared to the maximum preamble transmission limit, $M_{max}$ (step 212). If the RACH preamble transmission counter is greater than $M_{max}$, the MAC entity 120 indicates to a higher layer that the maximum number of RACH preamble transmissions has been reached, (i.e., TX status "unsuccessful"), (step 214) and the process 200 ends.

If the RACH preamble transmission counter is not greater than $M_{max}$, the MAC entity 120 updates RACH transmission control parameters (step 216). The MAC entity 120 sets timer $T_2$ (step 218). The timer $T_2$ ensures that the successive persistence tests are separated by at least the predetermined period of time, (e.g., 10 ms). The MAC entity 120 draws a random number and compares the random number to the persistence value Pi (steps 220, 222). If the drawn random number is greater than the persistence value Pi, the MAC entity 120 waits for expiration of timer $T_2$ at step 224 and the process 200 returns to step 216.

If the drawn random number is not greater than the persistence value, the MAC entity 120 starts the physical layer PRACH transmission procedure, (i.e., sends an RACH preamble), and waits for an E-DCH resource index (step 226). If it is determined at step 228 that no response is received on the AICH in response to the RACH preamble, the MAC entity 120 waits for expiration of timer $T_2$ at step 230 and the process 200 returns to step 210 to start a new RACH preamble procedure. If a negative acknowledgement (NACK) is received with no E-DCH resource assignment, the MAC entity 120 waits for expiration of timer $T_2$ at step 232. The MAC entity 120 then sets timer $T_{BOI}$ for back-off and waits for expiration of timer $T_{BOI}$ (step 234). The process 200 returns to step 210 at the expiration of timer $T_{BOI}$ to start a new RACH preamble procedure.

If an E-DCH resource index is received, the MAC entity 120 starts data transmission via the assigned E-DCH, (the MAC entity 120 requests data transmission to a physical layer via PHY-DATA-REQ), enters a contention resolution phase, and waits for a contention resolution (CR) message from a Node B (step 236). The contention resolution may be indicated via an E-DCH absolute grant channel (E-AGCH), (e.g., decoding of the WTRU's E-DCH radio network temporary identity (E-RNTI) on the E-AGCH through an E-RNTI-specific cyclic redundancy check (CRC) attachment). If the contention resolution is successful by receiving a CR message or indication, the MAC entity 120 indicates the transmission status as "successful" to a higher layer (step 244).

If a CR message or indication has not been received after a contention resolution timer ($T_{cr}$) expires or if another E-RNTI has been decoded on an E-AGCH (this is applicable if strict timing requirements apply to the first transmission and reception of the CR message on the E-AGCH) a collision has occurred and the contention resolution fails. If the contention resolution fails, the MAC entity 120 may optionally indicate contention resolution failure and/or resource release to higher layer and wait for the expiration of timer $T_2$ (steps 239, 240), and then set a contention back-off timer $T_{CBOI}$, (e.g., to $N_{CBOI} \times 10$ ms), and wait for expiration of timer $T_{CBOI}$ (step 242). The contention back-off timer $T_{CBOI}$ may be same to the back-off timer $T_{BOI}$. Upon expiration of timer $T_{CBOI}$, the process 200 may reinitiate the E-RACH procedure, for example by returning to step 210.

The contention back-off timer $T_{CBOI}$ may be set to an integer multiple ($N_{CBOI}$) of back-off interval, (e.g., 10 ms or 2 ms), that is randomly drawn between a minimum interval and a maximum interval. The minimum and maximum intervals may be configured by the RRC entity 140 or predefined in the WTRU 100. $N_{CBOI}$ may be equivalent to $N_{BOI}$. Alternatively, if a fixed delay is desired, (e.g., if the E-DCH resources are always reserved for 100 ms) the minimum and maximum intervals may be set as equal.

When the contention resolution fails, the E-DCH resources used for transmission of the E-RACH message have to be released. As such, the E-DCH transmission and reception stop, and the hybrid automatic repeat request (HARQ) processes are flushed. Additionally, the MAC-i/is entity 122 may be reset. In this case, the Node B may notify the serving radio network controller (SRNC) where the MAC-is entity for that WTRU 100 resides to also reset the variables and discard any segments in the reassembly buffer of the MAC-is.

If collision failures occur consecutively, the contention back-off timer may be increased by a factor, (e.g., after every consecutive collision the contention back-off timer is doubled). For example, after the first collision the MAC entity 120 uses the configured contention back-off timer, but after the second collision the contention back-off timer may be multiplied by a factor pre-configured in the WTRU 100 or by the network or broadcasted in the SIB. After a maximum number of consecutive collisions, the WTRU 100 may end the procedure 200 and perform one or a combination of the following:

(1) Stop attempting E-RACH access and attempt Release 99 (R99) RACH access; or
(2) End E-RACH procedure and re-initiate a PRACH code selection, where the WTRU 100 has an option to exclude the current PRACH code.

In accordance with a second embodiment, after a collision is detected, (i.e., fail to receive the CR message or decode another E-RNTI on the E-AGCH, etc.), instead of starting the contention back-off timer at step 242, the MAC entity 120 may start the persistence test right away for a subsequent RACH preamble transmission, (i.e., the process 200 returns to step 210 without setting and waiting for the expiration of timer $T_{CBOI}$). If the persistence test passes, the physical layer PRACH access procedure starts. The persistence value (Pi) may be reduced from its initial value to reduce the frequency of random access attempts, thus achieving the same effect as a back-off timer. For instance, the persistence value may be divided by two (2) after every time a collision occurs (until one access is successful).

Alternatively, the MAC entity 120 may skip the persistence test and immediately performs the physical layer PRACH access procedure, (i.e., the process 200 returns to step 226).

When performing the physical layer PRACH access procedure, the MAC entity 120 may inform the physical layer 110 that a collision occurred and provide the signature previously used which resulted in collision. The physical layer 110 may remove the given signature or a set of signatures associated to the presumably busy E-DCH resource from the list of available signatures for the WTRU 100. The signature or set of signatures may be removed for the WTRU 100 for a predetermined period of time or may be removed only for the physical layer PRACH access procedure at the given time. If the WTRU 100 makes subsequent attempts the WTRU 100 may use that signature for the subsequent attempts, (i.e., the WTRU resets the list of available signatures). The signature may be available for selection for all other WTRUs within the same ASC and PRACH code.

Alternatively, the signature may be temporarily (for a predetermined period of time) unavailable for all WTRUs within the selected PRACH code. This would require new downlink signaling.

In accordance with a third embodiment, after the contention resolution fails, the WTRU 100 may re-initiate a PRACH code selection procedure as specified in the 3GPP TS 25.331. This will allow the WTRU 100 further randomize its selection and thus reduce the probability of selecting the same resource.

In accordance with a fourth embodiment, after the contention resolution fails, a collision resolution procedure may be started in order to allow a Node B to determine the WTRUs that were involved in the collision and assign different E-DCH resources to each of these. This may be achieved by keeping a reserved set of PRACH resources to be used solely for collided WTRUs. The reserved PRACH resources may be in the form of a separate PRACH code, a reserved set of signatures, or a reserved set of access subchannels. Collided WTRUs may perform the physical layer PRACH access procedure (or some similar procedure) with the reserved PRACH resource. Once the collided WTRUs are determined, the Node B assigns an E-DCH resource to the collided WTRUs for uplink transmission.

A WTRU 100 may initiate data transmission over an E-DCH during the contention resolution phase. If the contention resolution fails, the data being transmitted during the contention resolution phase may be lost. Embodiments for data recovery and E-DCH resources management when contention resolution phase fails are disclosed hereinafter.

In accordance with a fifth embodiment, the WTRU 100 recovers the data transmitted during the contention resolution phase and attempts to retransmit the data. This may be achieved using one of the combination of the following methods.

The HARQ process timing for initial transmission may be designed such that the time between the first transmission and the time to resolve collision detection is not greater than the time it takes to complete all the HARQ retransmissions. This implies that at the time the WTRU 100 realizes that data has collided, the original data is still in the HARQ buffer. The WTRU 100 keeps the data already in the HARQ process, (i.e., does not discard them), until a new physical later PRACH access procedure is completed and an E-DCH resource is received. The data maintained in the HARQ process from the previous transmission may be considered and treated as new data, (i.e., the retransmission sequence number (RSN) is set to '0').

Alternatively, the WTRU 100 may store all the data sent to the HARQ processes during the contention resolution phase in a temporary buffer, (i.e., either in the RLC or MAC). The data stored may include RLC PDUs, MAC-is PDUs, or MAC-i PDUs. The data is stored until the contention resolution is resolved. If the contention resolution is successful, the data is discarded and the WTRU 100 continues normal operation. If data has collided, the WTRU 100 flushes the HARQ processes, optionally resets the MAC-i/is entity, to reinitialize the transmission sequence number (TSN), and stores the data until the new physical layer PRACH access procedure is complete and the new E-DCH resource index is assigned. The WTRU 100 attempts to retransmit the data stored during the previous contention resolution phase. The WTRU 100 may store the data until contention is resolved again. The WTRU 100 may attempt to retransmit the data up to a predetermined maximum number of times. If it fails after the maximum number of times the WTRU discards the data and waits for higher layer retransmission procedures to recover the data.

Alternatively, if the contention resolution fails, the HARQ process may notify the RLC entity 130 of the failed HARQ process and corresponding PDUs. The RLC entity 130 may then recover the lost data and transmit them in the next E-RACH attempt. For unacknowledged mode (UM) RLC, the RLC entity 130 may store the data in the transmission buffer as RLC SDUs. Upon HARQ notification the RLC entity 130 knows which RLC SDU(s) the failed PDU(s) correspond to and thus retransmits the RLC SDUs.

Alternatively, the indication to the RLC entity 130 may not give specific HARQ status information. This indication may be used by the RLC entity 130 to indicate that the data sent to lower layers was unsuccessful since the initiation of the E-RACH access, (i.e., since an E-DCH resource index has been assigned). This indication may be a new trigger for the RLC entity 130 to initiate retransmission of outstanding RLC PDUs waiting to be acknowledged. The MAC entity 120 may use the MAC-STATUS-Ind primitive to indicate that the transmission has been unsuccessful due to collision. The primitive may be extended to explicitly indicate that the failure resulted due to contention, or alternatively the primitive may remain unchanged and only indicate "transmission unsuccessful". The WTRU 100 may implicitly know that a collision has occurred if a transmission success is indicated at the beginning of the E-RACH procedure which is followed by a transmission failure message.

Alternatively, the MAC entity 120 may not send a transmission success message as soon as an E-DCH resource is assigned. The MAC entity 120 may wait to contention resolution prior to sending the transmission success message so that if the transmission fails, only the transmission failure message is sent to the RLC entity 130. To the RLC entity 130, the reason for E-RACH access failure remains transparent, and therefore, the RLC entity 130 may retransmit any outstanding data waiting to be acknowledged if available.

If the transmitted message is an RRC message, the RRC entity 140 may store all the RRC messages transmitted in Cell_FACH state and retransmit the stored RRC messages. The RRC message retransmission may be triggered by either a notice from the HARQ entity (a HARQ failure indication) or expiration of an RRC timer. The HARQ entity notifies the RRC entity 140 of the failed HARQ processes after the HARQ entity has attempted the maximum number of times. If an HARQ failure indication is received, the RRC timer is stopped and the RRC 140 retransmits the RRC message. Optionally, an HARQ success indication may also be sent to the RRC entity 140, which causes the RRC entity 140 to stop the RRC timer.

Alternatively the HARQ entity may attempt to retransmit the same RRC message, (i.e., different physical layer PRACH access attempts), for a predetermined number of times before sending the HARQ failure indication. The number of times the WTRU 100 attempts may be predefined in the WTRU 100, signaled by the RRC messages, (i.e., as new values or values equivalent to N302, etc.), or broadcast on a system information block (SIB).

Alternatively, the MAC entity 120 may extract the packet(s) from the HARQ buffer(s) and rebuild a new MAC PDU at the new physical layer PRACH access attempts. The HARQ buffers may be flushed and optionally the MAC-i/is entity may be reset prior to retransmitting the rebuilt MAC PDU.

Alternatively, the WTRU 100 may flush the HARQ processes and optionally reset the MAC-i/is entity upon contention resolution failure. The data may then be recovered by the higher layers, (e.g., RLC acknowledged mode (AM) retransmissions, RRC message retransmission upon RRC timer expiration, etc.).

Although the embodiments are described in the context of contention resolution, the embodiments disclose above are also applicable during normal E-RACH transmissions after contention resolution when the WTRU detects a HARQ failure.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for performing an enhanced random access procedure in a Cell_FACH state, the method comprising:
   transmitting a random access channel (RACH) preamble;
   obtaining an enhanced dedicated channel (E-DCH) resource index in response to The RACH preamble;
   entering a contention resolution phase and transmitting a message using an assigned E-DCH resource;
   monitoring an E-DCH absolute grant channel (E-AGCH); and
   on a condition that contention resolution fails because no E-AGCH with a WTRU's E-DCH radio network temporary identity (E-RNTI) is received within a predetermined period of time, releasing the E-DCH resource and resetting an MAC-i/is entity.

2. The method of claim 1, wherein determining whether the contention resolution fails is based on an E-RNTI specific cyclic redundancy check attachment.

3. The method of claim 1, further comprising:
   setting a back-off timer if contention resolution fails; and
   starting a new random access procedure after expiration of the back-off timer.

4. The method of claim 1, wherein a MAC-STATUS-Ind primitive indicates the contention resolution failure, indicating a transmission was unsuccessful due to collision.

5. The method of claim 3, further comprising:
   reselecting a physical random access channel (PRACH) code after the back-off timer expires; and
   retransmitting the RACH preamble using the reselected PRACH code.

6. The method of claim 1, further comprising:
   initiating a physical random access channel (PRACH) code selection if a maximum number of consecutive contention resolution failures occur; and
   reinitiating a random access procedure with a reselected PRACH code.

7. The method of claim 1, wherein a signature used for transmission of the RACH preamble that resulted in the contention resolution failure is removed from a list of available signatures.

8. The method of claim 1, wherein the RACH preamble is retransmitted using a reserved physical random access channel (PRACH) resource if the contention resolution fails.

9. The method of claim 1, wherein when the contention resolution fails at least one of the following actions is performed: stopping E-DCH transmission, stopping E-DCH reception, or flushing a hybrid automatic repeat request (HARQ) buffer.

10. The method of claim 1, wherein a physical layer controls retransmission of radio resource control (RRC) messages after the contention resolution fails.

11. A wireless transmit/receive unit (WTRU) configured to perform a random access procedure in a Cell_FACH state, the WTRU comprising:
    a physical layer configured to transmit a random access channel (RACH) preamble; and
    a medium access control (MAC) entity configured to obtain an enhanced dedicated channel (E-DCH) resource index in response to the RACH preamble, enter a contention resolution phase upon transmission of a message using an assigned E-DCH resource, monitor an E-DCH absolute grant channel (E-AGCH); and
    if contention resolution fails because no E-AGCH with a WTRU's E-DCH radio network temporary identifier (E-RNTI) is received within a predetermined period of time, release the assigned E-DCH resource and reset an MAC-i/is entity.

12. The WTRU of claim 11, wherein determining whether the contention resolution fails is based on an E-RNTI specific cyclic redundancy check attachment.

13. The WTRU of claim 11, wherein the MAC entity is configured to set a back-off timer if the contention resolution fails, and start a new random access procedure after expiration of the back-off timer.

14. The WTRU of claim 13, wherein a physical random access channel (PRACH) code is reselected after the back-off timer expires, and the RACH preamble is retransmitted using the reselected PRACH code.

15. The WTRU of claim 11, wherein the MAC entity is configured to initiate a physical random access channel (PRACH) code selection if a maximum number of consecutive contention resolution failures occur.

16. The WTRU of claim 11, wherein the MAC entity is configured to remove a signature used for transmission of the RACH preamble that resulted in the contention resolution failure from a list of available signatures.

17. The WTRU of claim 11, wherein the MAC entity is configured to retransmit the RACH preamble using a reserved physical random access channel (PRACH) resource if the contention resolution fails.

18. The WTRU of claim 11, wherein a MAC-STATUS-Ind primitive indicates the contention resolution failure, indicating a transmission was unsuccessful due to collision.

19. The WTRU of claim 11, wherein when the contention resolution fails at least one of the following actions is performed: stopping E-DCH transmission, stopping E-DCH reception, or flushing a hybrid automatic repeat request (HARQ) buffer.

20. The WTRU of claim 11, wherein the physical layer is configured to control retransmission of radio resource control (RRC) messages after the contention resolution fails.

* * * * *